(12) United States Patent
Galbiati et al.

(10) Patent No.: US 7,834,568 B2
(45) Date of Patent: Nov. 16, 2010

(54) METHOD AND DEVICE FOR DRIVING A BRUSHLESS MOTOR WITH VOLTAGE WAVEFORM PREDISPOSED FOR A PROGRESSIVE AND AUTOMATIC SWITCHING FROM A THREE-PHASE SINUSOIDAL DRIVING TO A SQUARE WAVE THREE-PHASE DRIVING

(75) Inventors: Ezio Galbiati, Agnadello (IT); Michele Cassiano, Cornaredo (IT)

(73) Assignee: STMicroelectronics S.R.L., Agrate Brianza (MI) (IT)

( * ) Notice: Subject to any disclaimer, the term of this patent is extended or adjusted under 35 U.S.C. 154(b) by 296 days.

(21) Appl. No.: 12/175,626

(22) Filed: Jul. 18, 2008

(65) Prior Publication Data
US 2009/0026990 A1 Jan. 29, 2009

(30) Foreign Application Priority Data
Jul. 25, 2007 (IT) .............................. VA07A0065

(51) Int. Cl.
H02P 27/06 (2006.01)
(52) U.S. Cl. .............................. 318/400.12; 318/400.02; 318/400.3; 318/400.04; 318/729; 318/811; 318/812
(58) Field of Classification Search ................. 318/254, 318/494, 400.02, 400.3, 400.04, 400.12, 318/723, 729, 811, 812
See application file for complete search history.

(56) References Cited

U.S. PATENT DOCUMENTS

| | | | | |
|---|---|---|---|---|
| 5,541,484 A * | 7/1996 | DiTucci | ................. | 318/400.04 |
| 6,137,253 A | 10/2000 | Galbiati et al. | .............. | 318/599 |
| 6,984,953 B2 * | 1/2006 | Quirion et al. | ........... | 318/400.3 |
| 7,075,267 B1 * | 7/2006 | Cheng | ........................ | 318/807 |
| 7,102,327 B2 * | 9/2006 | Ho | .............. | 318/812 |
| 7,339,344 B2 * | 3/2008 | Borisavljevic et al. | ...... | 318/723 |
| 7,348,757 B2 * | 3/2008 | Takahashi | ................... | 318/811 |
| 7,348,758 B2 * | 3/2008 | Ho | ............. | 318/811 |
| 2004/0195995 A1 * | 10/2004 | Quirion et al. | .............. | 318/811 |
| 2005/0110442 A1 * | 5/2005 | Trifilo | ........................ | 318/254 |
| 2005/0206341 A1 * | 9/2005 | Yin Ho | ....................... | 318/812 |
| 2008/0250050 A1 * | 10/2008 | Cracchiolo et al. | .......... | 707/102 |
| 2008/0267342 A1 * | 10/2008 | Grass et al. | .................... | 378/4 |
| 2008/0267480 A1 * | 10/2008 | Nielsen et al. | .............. | 382/131 |

(Continued)

Primary Examiner—Paul Ip
(74) Attorney, Agent, or Firm—Lisa K. Jorgenson; Allen, Dyer, Doppelt, Milbrath & Gilchrist, P.A.

(57) ABSTRACT

The method and a related device are for driving a brushless motor, according to which by acting solely on the control value, that is by reducing or increasing it, the driving mode eventually passes from a sinusoidal three-phase driving mode to a distorted square-wave three-phase driving mode for increasing or maximizing the voltage that may be supplied to each motor winding or vice versa. An effective drive voltage profile includes, cyclically, during each 60 electrical degree interval, profiles of re-constructed outphased complete drive waveforms including a first one stably in a saturated region, a second one exiting, at the beginning of the interval, a state of incipient saturation, and a third one reaching, at the end of the interval, a state of incipient saturation. In this way, by modifying the numerical control value it is possible to pass from a sinusoidal drive mode to a distorted drive mode of enhanced maximum peak value or vice versa.

20 Claims, 7 Drawing Sheets

U.S. PATENT DOCUMENTS

2009/0058334 A1* 3/2009 Yamamoto ............. 318/400.02
2009/0206785 A1* 8/2009 Garcia ........................ 318/494
2009/0212733 A1* 8/2009 Hsieh et al. .................. 318/729
2009/0310727 A1* 12/2009 Rouis ......................... 375/360

* cited by examiner

METHOD AND DEVICE FOR DRIVING A BRUSHLESS MOTOR WITH VOLTAGE WAVEFORM PREDISPOSED FOR A PROGRESSIVE AND AUTOMATIC SWITCHING FROM A THREE-PHASE SINUSOIDAL DRIVING TO A SQUARE WAVE THREE-PHASE DRIVING

FIELD OF THE INVENTION

This invention relates to driving techniques of electronically switched DC motors, commonly known as brushless motors.

BACKGROUND OF THE INVENTION

Figure 1:
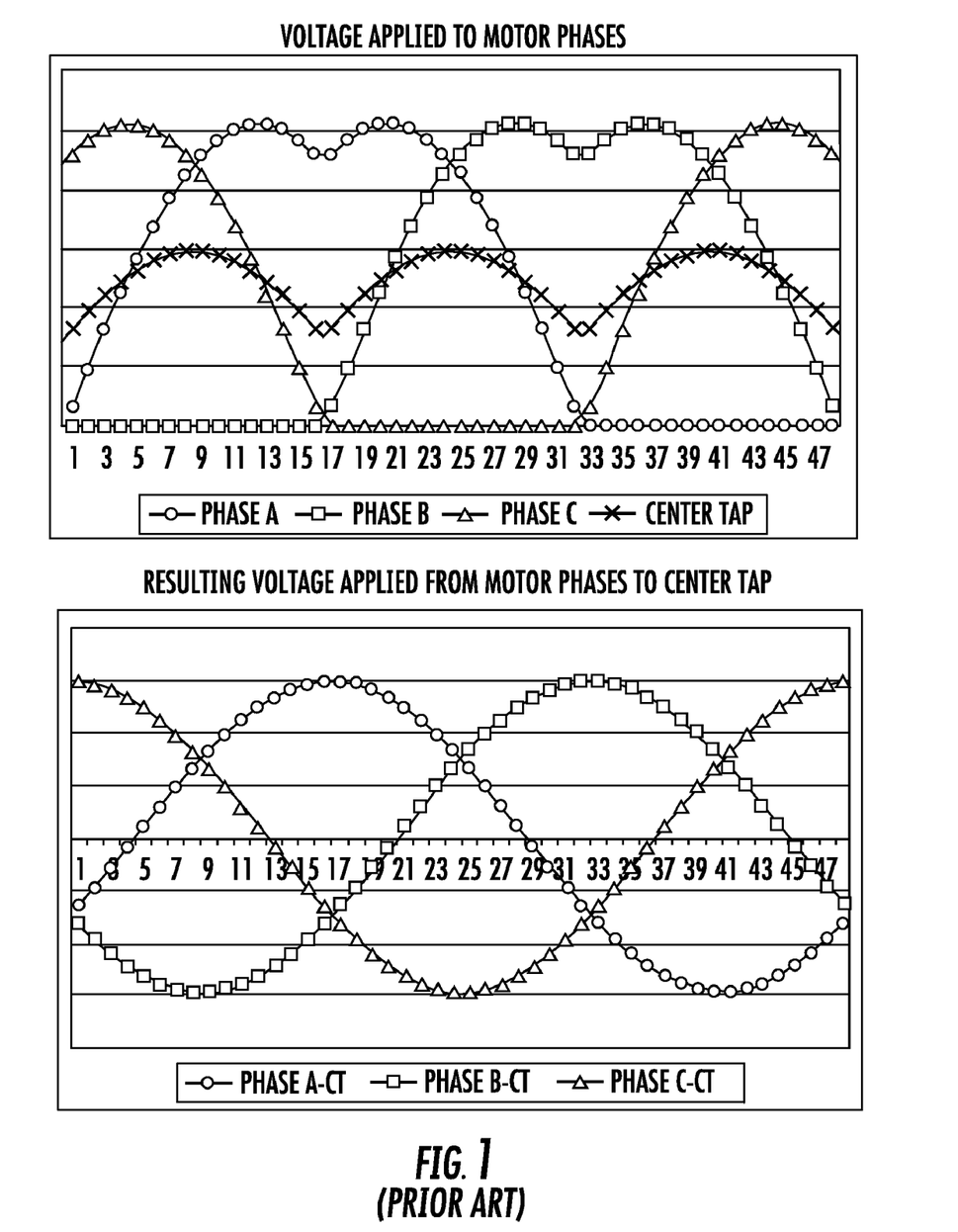
FIG. 1 is a waveform diagram illustrating the waveforms of the three voltages applied to the motor phases and the resulting voltages between each tap and a neutral-point in a prior art system.

Typically, a brushless motor is driven by properly powering the motor phases synchronously with the instantaneous position of the motor. According to an innovative driving technique, disclosed in U.S. Pat. No. 6,137,253 to the same Assignee, excitation voltages are applied to the phase windings of the motor and that, instead of substantially having a certain pre-established constant level during each switching phase, have a certain pre-established (non-constant) drive voltage profile, digitized and stored in a nonvolatile static memory device, for example in an EPROM or EEPROM memory. The system drives the motor such that at a certain PWM modulated voltage profile is cyclically supplied with the appropriate 120 electrical degrees outphasing to two phase windings, keeping the third winding in a saturation state (e.g. as shown in FIG. 1).

With this technique, while a phase winding is kept in a saturation state (for an interval of time equivalent to a 120 electrical degrees rotation), it is possible to produce between this phase tap and the neutral point (CT), for a star configuration, or between this phase tap and another tap, for a triangle configuration, a properly outphased voltage equivalent to those applied to the taps of the other two windings, because in any of the two configurations of the three phase windings the system is intrinsically balanced. The three tap voltages will be reciprocally outphased by 120 electrical degrees. The system has several drawbacks that are discussed hereinbelow.

Figure 2:
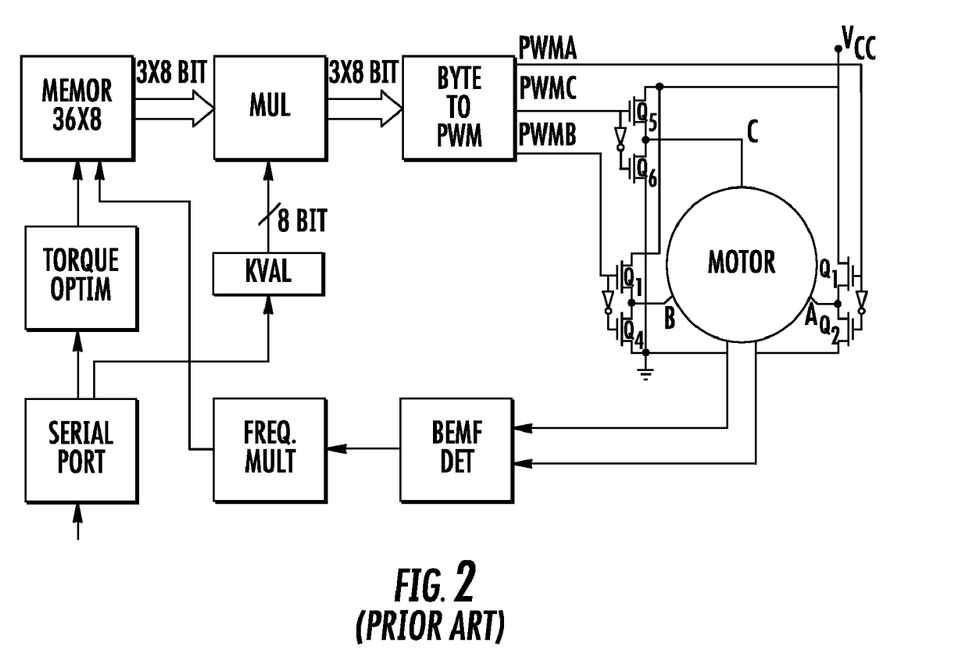
FIG. 2 is a schematic block diagram of a prior art motor control system.

Speed control is executed by modulating the amplitude of the reciprocally outphased drive voltage profiles applied to the electrical connection taps of three phase windings of the motor. FIG. 2 depicts a block diagram of the system. The operations carried out by each block are described in detail in the prior U.S. Pat. No. 6,137,253. Modulation of the amplitude of the three voltages supplied to the motor for controlling speed is done through the block MUL that multiplies the value of the three voltage profiles that are received by the memory block MEMOR by the value of the variable KVAL. The block BEMF DET generates a signal representing the back-electromotive force (BEMF) and the block BYTE-TO-PWM converts the numerical samples of the reciprocally outphased drive voltage profiles for generating three PWM driving signals PWMA, PWMB and PWMC of the respective output half-bridges. The full dynamic is attained when the three drive voltage profiles applied to the motor winding taps assume a peak value equal to the supply voltage VCC of the output power stage, configured as a triple half-bridge.

Figure 3A:
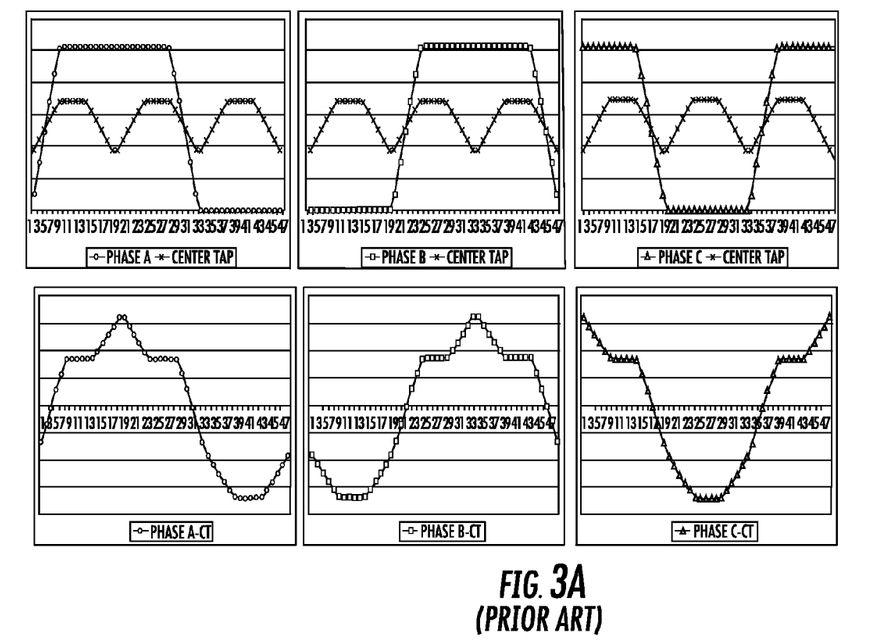
FIG. 3A is a waveform diagram illustrating voltage waveforms in a prior art system with a KVAL amplified by 1.5 times (+50%).
Figure 3B:
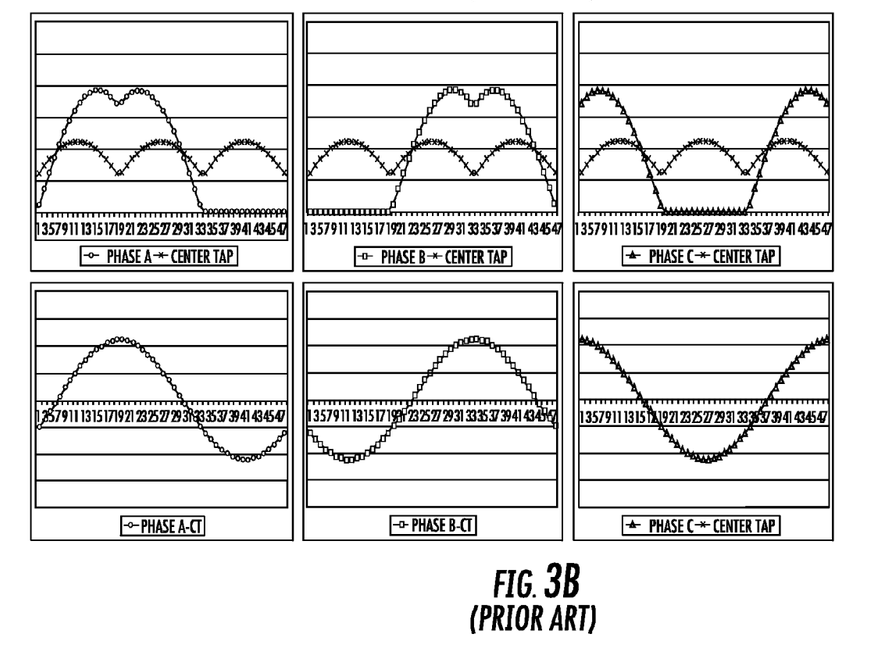
FIG. 3B is a waveform diagram illustrating voltage waveforms in a prior art system with a KVAL attenuated by 0.75 times (−25%).

FIGS. 3A and 3B depict sample cases in which KVAL amplifies by a factor 1.5 and 0.75 (50% more and 25% less), respectively, the three voltage profiles. In the case of FIG. 3A, by amplifying by 1.5, the three voltage profiles are forced to a saturation state at the maximum supply voltage VCC. The effect of forcing saturation is a distortion of the resultant voltage between the winding tap and the neutral point, in the case of a star configuration. In particular, it is observed that the voltage between the winding tap and the neutral point is distorted in an asymmetric fashion with respect to the power supply reference potential (zero or ground potential). Moreover, the difference between the tap voltage and the voltage of the neutral point for star configured motor windings is positive for a time interval longer than the time in which it has a negative polarity. Similar asymmetric distortions are experienced also in the case of triangle configuration. Consequently, the motor is driven in an unbalanced manner and, since the resulting currents are not always in phase with the angular position of the motor, electromotive forces in phase opposition with the motor rotation are generated for several periods thus reducing the efficiency of the system, besides causing an increase of the torque ripple.

In the case of FIG. 3B, by amplifying by 0.75, the three profiles are down scaled with respect to the maximum supply voltage VCC. In this case there are no saturation effects, but there is another drawback. Reducing the level of the voltage profile that is supplied to the phase windings of the motor is equivalent to compressing the duty-cycle of the PWM signals that control the triple half-bridge output stage. This problem may become significant with the duty-cycles that are attained when the drive voltage profile applied to a winding enters or leaves a full saturation state at every 120 electrical degrees. Because the slew-rate is not infinite, when the resulting duty-cycle becomes relatively small, the equivalent voltage supplied to the motor phases differs from the expected theoretical value, thus causing a distortion. This distortion is directly proportional to the duty-cycle, to the PWM frequency and is inversely proportional to the control value KVAL.

Also, hard disks are used in modern monitoring and control systems in sectors different from personal computers, such as for example in the automotive sector where temperature conditions may be very severe. The most common spindle motors have fluid-dynamic bearings, because of their good performance in terms of acoustic noise and vibrations. At low temperatures, the fluid becomes denser and more viscous and under particular conditions, at reduced supply battery voltage, startup of the motor and reaching of the desired speed may be difficult. Sometimes, reaching of the correct steady-state speed may take several minutes upon heating up of the fluid in the bearings of the motor bearings. This can hardly be accepted as it fails the "spin-up" time specifications. To meet such specifications, it is desirable to supply the spindle motor with the full available power supply voltage using a driving system of high efficiency.

SUMMARY OF THE INVENTION

The present invention provides a method and a related device for driving a brushless motor, according to which by acting solely on the control value, that is by reducing or increasing it, the driving mode eventually passes from a sinusoidal three-phase driving to a distorted square-wave three-phase driving for increasing or maximizing the voltage that may be supplied to each motor winding or vice versa.

To this end, a particularly effective drive voltage profile has been found such that cyclically during each 60 electrical degree interval the profiles of re-constructed outphased complete drive waveforms are: a first one stably in a saturated region, a second one exiting, at the beginning of the interval, a state of incipient saturation, and a third one reaching, at the end of the interval, a state of incipient saturation. In this way, by modifying the numerical control value it is possible to pass from a sinusoidal drive mode to a distorted drive mode of enhanced maximum peak value or vice versa.

An undistorted sinusoidal voltage profile between the phase taps and the neutral point for a star configuration, or of the voltage difference between the voltage waveforms applied to any two phase taps and the common ground node, for a triangle configuration, is ensured during sinusoidal driving of the motor notwithstanding the fact that the stored digitized profile or part of a complete periodic profile of drive waveform is not of a sinusoid. The voltage profile while ensuring that a saturated state be cyclically assumed by the phase windings for an interval of 120 electrical degrees during a full electrical revolution, such a 120° interval is split in two equal "sub-intervals" of 60 electrical degrees each, one during which the lower switches of the respective half-bridges saturate and the other during which the upper switches saturate, the two sub-intervals of saturation being separated by 120 electrical degrees.

DETAILED DESCRIPTION OF THE PREFERRED EMBODIMENTS

For simplicity sake, the detailed description of a practical embodiment of this invention that ensues will refer to the case of a star connected three-phase motor that has a physically identifiable neutral point (CT), however, as will be immediately clear to the skilled artisan, the same considerations hold with the appropriate changes also for a triangle connected three-phase motor according to the already stated provision that the resulting sinusoidal or square waveforms that are produced on each phase winding of the motor should be seen as the resulting difference voltage between the drive voltage waveforms applied to any two phase taps and the common ground node.

Figure 4A:
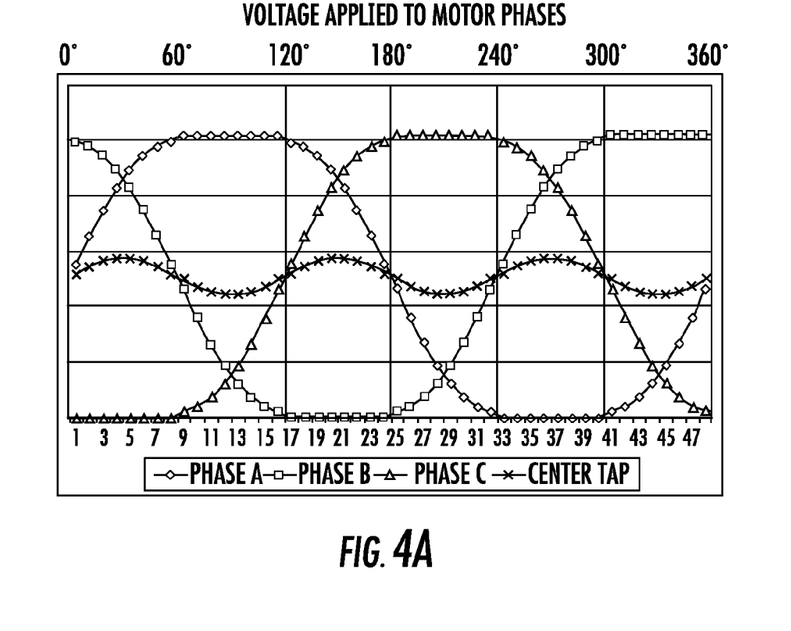
FIG. 4A is a waveform diagram illustrating voltage profiles applied to the phase taps, with KVAL=1 (100%), according to the method of the present invention.
Figure 4B:
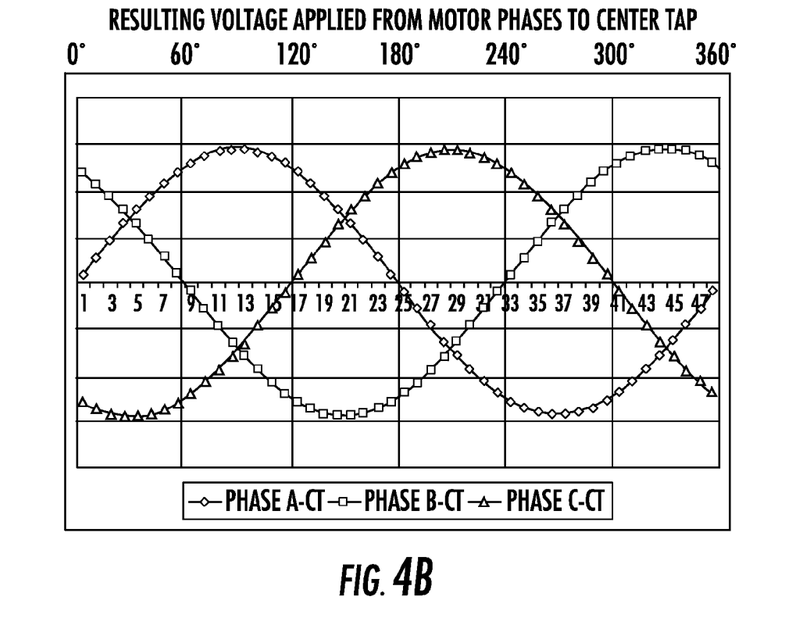
FIG. 4B is a waveform diagram illustrating waveforms of resulting voltages between the phase taps and the neutral point upon supplying the voltages of FIG. 4A to phase taps of the motor.

FIG. 4A depicts the three drive voltage profiles that are applied to the taps of the motor phase windings and FIG. 4B depicts the three resulting voltages that are produced between each phase tap and the neutral point, according to the method. The applied voltage profiles are symmetrical about the neutral point, the positive portion in respect to the neutral-point remains identical to the negative part of the voltage under any "level" of duty cycle. This overcomes the problems of prior art techniques effectively preventing non symmetrical distortion of the voltage waveform between the phase taps and the neutral point upon modulating the drive voltages to be applied to the phase windings of the motor by multiplying the numerical values of the digitized profile samples stored in the memory by the control value KVAL, and allowing application of the full supply voltage to the motor windings.

Looking at the three voltage profiles of FIG. 4A, it is observed that during every interval of 60 electrical degrees, one of which, from 120° to 180° may be singled out, the motor moves from a slight saturation state of the phase drive voltage applied to the winding A to a deep saturation state of the phase drive voltage applied to the winding B and to a slight saturation state of the phase drive voltage applied to the winding C and so forth for the other 60° intervals in which is divided a full electrical revolution of 360°. During every interval of 60 degrees there is a complementary symmetry among the three out-phased drive voltage waveforms.

Figure 5:
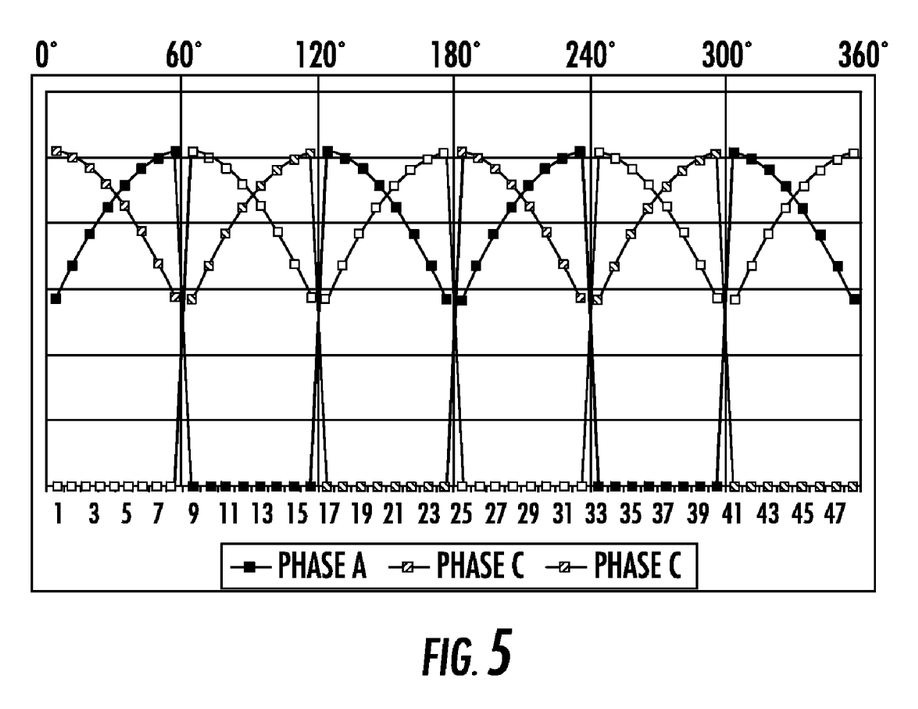
FIG. 5 is a waveform diagram illustrating the voltage profile to be stored in the memory.

The three voltage profiles depicted in FIG. 5 are obtained by complementing the three voltage waveforms of FIG. 4A in the intervals from 60° to 120°, from 180° to 240° and from 300° to 360°. The modified profile or profiles that may be stored in the memory and from which the three out-phased drive voltage waveforms are finally reconstructed, allow to retain the commonly used modulation strategy by way of the control variable KVAL of the drive voltages to be actually applied to the phase taps of the motor.

Having modified the digitized voltage profile to be stored in the memory, (referring to FIG. 6) the output of the block MUL that multiplies the value of the three out-phased profiles output by the block MEMOR by the value of the control variable KVAL, before being sent to the reconstructing and converting block BYTE-TO-PWM, should be conditioned in function of the angular position of the rotor during a complete electrical revolution. For this reason, the additional block INV__60° driven by the block SEL__60° is included between the block MUL and the block BYTE-TO-PWM.

In the intervals 0-60°, 120°-180° and 240°-300°, the output of the block MUL is conveyed as such to the block BYTE-TO-PWM, while in the intervals 60-120°, 180°-240° and 300°-360°, the output of the block MUL is inverted before being conveyed to the block BYTE-TO-PWM. The block diagram of FIG. 6 highlights the additional blocks, INV__60° and SEL__60° that carry out the additional steps because of the modification of the drive profile or profiles that are stored in the memory.

Figure 7A:
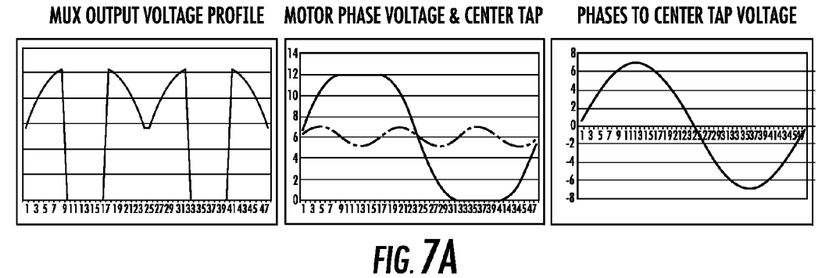
FIG. 7A is a waveform diagram illustrating voltage waveforms in the system of the invention for KVAL=100%.
Figure 7B:
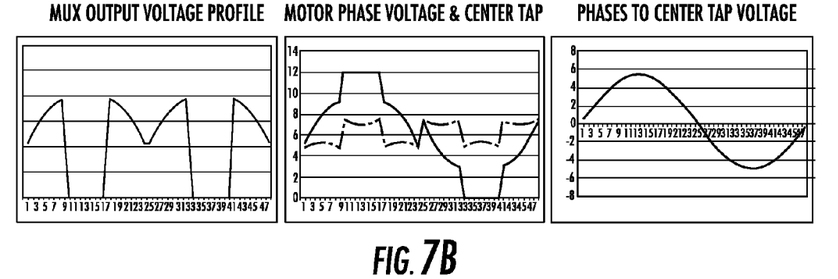
FIG. 7B is a waveform diagram illustrating voltage waveforms in the system of the invention for KVAL=75%.
Figure 7C:
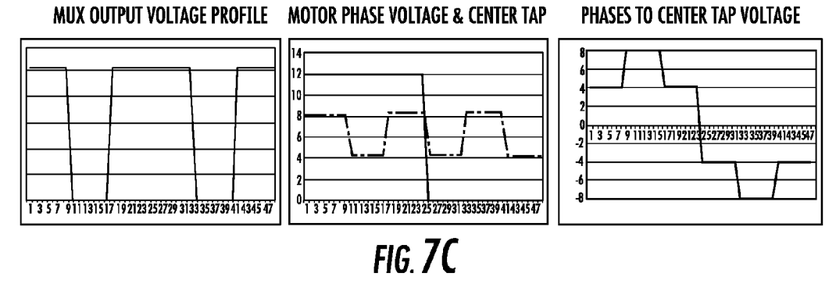
FIG. 7C is a waveform diagram illustrating voltage waveforms in the system of the invention for KVAL=200%.

FIGS. 7A, 7B and 7C depict waveforms of the reconstructed out-phased drive voltages that are applied to the taps of the phase windings of the spindle motor and of the resulting voltages that are produced between the windings taps and the neutral point of the star connected windings, relative to the drive voltage profile output by the block MUL as the product between the stored profile sample values and the control variable KVAL. In the depicted examples, the power supply voltage is 12V. For sake of clarity, only the voltage profile of a phase winding has been depicted, being evident that waveforms of the other two voltage profiles are equal but out-phased by 120° and 240°, respectively.

FIG. 7A depicts the case in which KVAL=1. The voltage applied to the motor has the full dynamic of the supply voltage VCC=12V; the resulting voltage between the phase taps and the neutral point is a sinusoid with 6.9V of peak value. The voltage applied to the motor always has a 60° phase of low saturation and a 60° phase of high saturation, for a total of 120° per electrical revolution.

FIG. 7B depicts the case in which KVAL=0.75. The voltage applied to the motor has a reduced dynamic in respect to the supply voltage VCC=12V; the resulting voltage between the phase taps and the neutral point is a sinusoid having a peak value of 5.19V (i.e. 75% of the peak of the case depicted in FIG. 6A). Also in this case the voltage supplied to the motor has a low saturation phase and a high saturation phase for 60° each, for a total of 120° per electric revolution; the difference in respect to the case of FIG. 7A being the profile between the two levels of high and low saturation.

FIG. 7C refers to the case in which KVAL=2. With an amplification factor twice the dynamic of the supply voltage dynamic, the drive voltage waveform becomes a square wave that for 180 electrical degrees is at high saturation while for the other 180° is at low saturation (0V). In the examples of FIG. 7C the resulting voltage between the phase taps and the neutral point is in this case no longer sinusoidal but reaches a peak value of 8V.

The case of FIG. 7C illustrates the advantages that are obtained with the present system: by varying solely the value of KVAL it is possible to pass from a condition of a substantially sinusoidal voltage between the phase taps and the neutral point, with a maximum peak value of 6.9V (with a VCC of 12V), to a condition in which the voltage between the phase taps and the neutral point is distorted to the point of significantly increasing its peak value.

For particular applications in which the spindle motor has fluid-dynamic bearings it may be necessary to start in conditions of lowered supply battery voltage under particularly low temperature (like in vehicles in freezing climate). The above described system permits supply of the phase windings of the motor with the largest possible voltage, that is with three square waves, mutually outphased by 120°, with a maximized voltage swing and with a duty-cycle of 50% (i.e. 180 electrical degrees at maximum level and 180 electrical degrees at zero). Given a certain value of supply voltage VCC, this driving condition is the best that can be obtained in terms of maximum voltage applied to the windings.

In the above description of exemplary embodiments, the drive profiles, stored in the block MEMOR, are shown quantized into 48 samples. This is of course only an example, being clear that the system may contemplate a different number of samples. Also by way of example, the three voltage profiles depicted in FIG. 5 were obtained by complementing the profiles of FIG. 4A in the intervals 60° to 120°, 180° to 240° and 300° to 360°. A viable alternative is to generate a different voltage profile by complementing the profiles of FIG. 4B in the intervals 0° to 60°, 120° to 180° and 240° to 300°, modifying accordingly when the output of the block MUL must be inverted before being sent to the block BYTE-TO-PWM.

Figure 6:
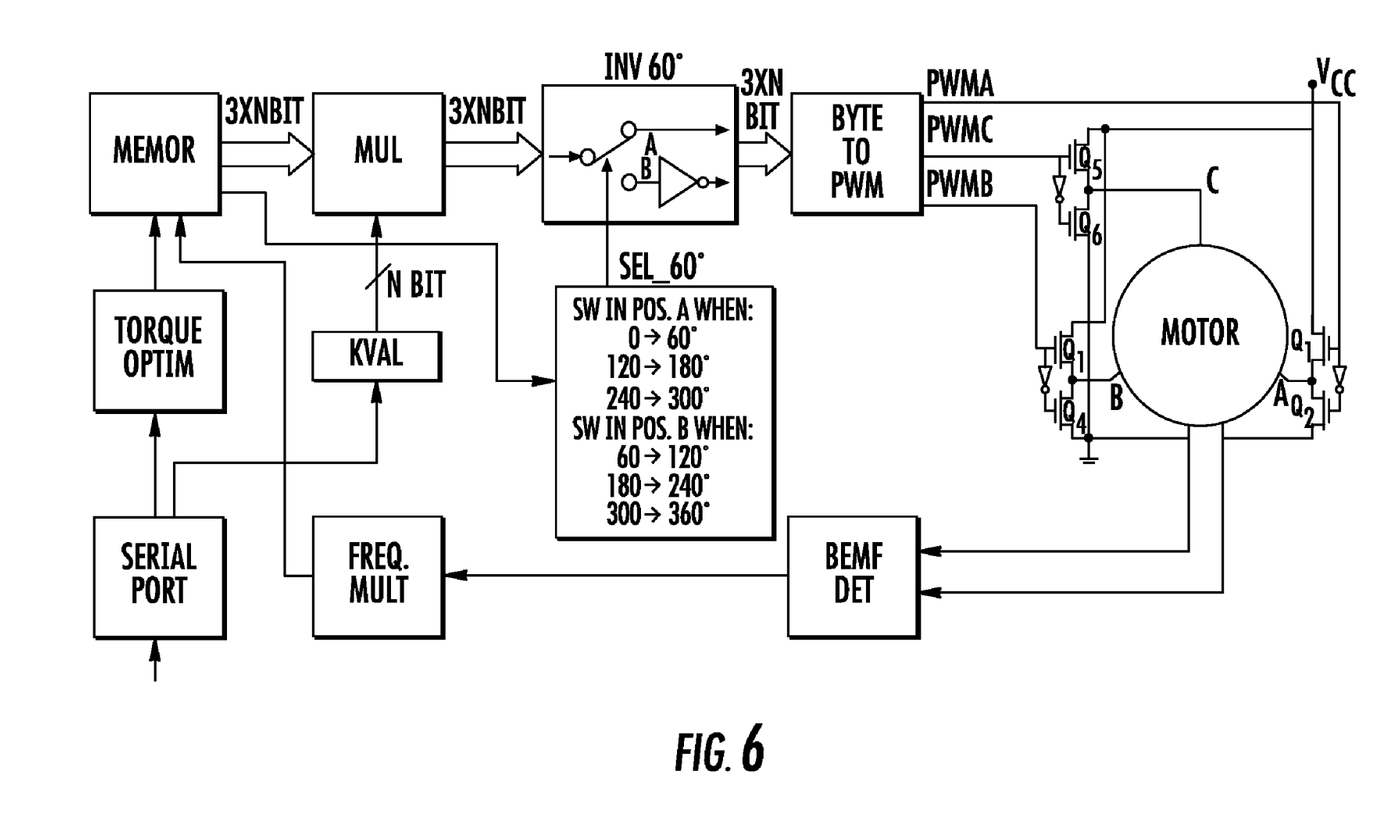
FIG. 6 is a schematic block diagram of a motor control system in accordance with the present invention.

The above description makes clear that with the modified voltage profile to be stored in the memory, specifically designed for achieving the highest saturation (peak) value of the output drive voltages, it is necessary to implement an inversion at intervals of 60°, mutually spaced by 60° (for example 60° to 120°, 180° to 240° and 300° to 360°). FIG. 6 shows the additional block INV_60 that carries out the necessary inversion functionally connected between the block MUL and the block BYTE-TO-PWM. An alternative way of making the necessary inversions is to intervene distinctly on the outputs PWMA, PWMB and PWMC of the block BYTE-TO-PWM.

The voltage profile to be stored in the memory is symmetric in reference to 180 electrical degrees. This means that the total number of stored samples can be halved compared to the prior art system and for reconstructing the whole electrical period it is sufficient to read the memory twice.

That which is claimed is:

1. A method of driving a three-phase brushless motor wherein 120 electrical degree out-phased voltage waveforms are synchronously produced on three phase windings of the motor, the method comprising:

storing numerical values in a memory corresponding to digitized sample values of at least a portion of a periodic profile;

reading the numerical values from the memory and applying a numerical control value to each numerical value to generate resulting numerical values;

reconstructing out-phased drive voltage waveforms from the profile portion and converting resulting numerical values thereof into three pulse width modulation (PWM) drive signals to be respectively applied to the windings;

wherein the out-phased drive voltage waveforms that are applied to the windings are peak value-related waveforms produced by storing in the memory the digitized sample values of the periodic profile such that cyclically, during each 60 electrical degree interval, profiles of the reconstructed out-phased drive voltage waveforms include a first profile that is stable in a saturated region, a second profile exiting, at the beginning of the interval, a state of incipient saturation, and a third profile reaching, at the end of the interval, a state of incipient saturation; and modifying the numerical control value for passing between a sinusoidal drive mode and a distorted drive mode.

2. The method of claim 1, wherein the peak value-related waveforms are one of sinusoidal waveforms with a maximum peak value and distorted waveforms of enhanced maximum peak value.

3. The method of claim 1, wherein the numerical control value is able range beyond a unit value corresponding to a maximum PWM dynamic to maintain a sinusoidal drive voltage on each winding of the motor, and producing, when increasing beyond the unit value, distorted square-waveforms of a peak value larger than that obtainable with sinusoidal waveforms.

4. The method of claim 3, wherein when the numerical control value increases beyond the unit value, the resulting drive voltages on each winding are symmetrically distorted in respect to a zero value.

5. The method of claim 1, further comprising reading the stored digitized sample values twice for reconstructing the mutually out-phased drive voltage waveforms.

6. The method of claim 1, wherein the windings are PWM driven through three output half-bridges, the out-phased drive voltage waveforms being such that at each instant of an electrical revolution, one of the output half-bridges is at one of a low and high saturation state, and the other two output half-bridges are switching.

7. The method of claim 6, wherein each output half-bridge is kept at the saturation state for 120 electrical degrees during an electrical revolution including being kept at low saturation state for 60 electrical degrees and at high saturation state for the other 60 electrical degrees, the low and high saturation states being separated by an interval of 120 electrical degrees during which the output half-bridge is PWM driven.

8. A method of driving a brushless motor including a plurality of windings, the method comprising:
- storing digitized sample values of at least a portion of a periodic profile in a memory;
- applying a control factor to each stored digitized sample value to generate modified profile values;
- generating mutually out-phased drive voltage waveforms from the profile portion and converting modified profile values thereof into drive signals to be respectively applied to the windings;
- wherein the out-phased drive voltage waveforms that are applied to the windings are peak value-related waveforms produced by storing in the memory the digitized sample values of the periodic profile such that cyclically, during each 60 electrical degree interval, profiles of the out-phased drive voltage waveforms include a first profile that is stable in a saturated region, a second profile exiting, at the beginning of the interval, a state of incipient saturation, and a third profile reaching, at the end of the interval, a state of incipient saturation; and
- modifying the control factor for passing between a sinusoidal drive mode and a distorted drive mode.

9. The method of claim 8, wherein the peak value-related waveforms are one of sinusoidal waveforms with a maximum peak value and distorted waveforms of enhanced maximum peak value.

10. The method of claim 8, wherein the control factor is able range beyond a unit value corresponding to a maximum PWM dynamic to maintain a sinusoidal drive voltage on each winding of the motor, and producing, when increasing beyond the unit value, distorted square-waveforms of a peak value larger than that obtainable with sinusoidal waveforms.

11. The method of claim 10, wherein when the control factor increases beyond the unit value, the resulting drive voltages on each winding are symmetrically distorted in respect to a zero value.

12. The method of claim 10, wherein the phase windings are driven through three output half-bridges, the out-phased drive voltage waveforms being such that at each instant of an electrical revolution, one of the output half-bridges is at one of a low and high saturation state, and the other two output half-bridges are switching.

13. The method of claim 12, wherein each output half-bridge is kept at the saturation state for 120 electrical degrees during an electrical revolution including being kept at low saturation state for 60 electrical degrees and at high saturation state for the other 60 electrical degrees, the low and high saturation states being separated by an interval of 120 electrical degrees during which the output half-bridge is driven.

14. The method of claim 8, further comprising reading the stored digitized sample values twice for generating the mutually out-phased drive voltage waveforms.

15. A device for driving a multi-phase brushless motor including a plurality of windings, the device comprising:
- a plurality of half-bridge stages connected to the windings;
- a memory for storing digitized sample values of at least a portion of a periodic profile of phase drive signals for the half-bridge stages;
- a modification block for modifying stored digitized sample values read from the memory based upon a control factor to generate modified profile values; and
- a control circuit for generating mutually out-phased drive voltage waveforms from the profile portion and converting modified profile values thereof into drive signals to be respectively applied to the windings via the half-bridge stages;
- wherein the out-phased drive voltage waveforms that are applied to the windings are peak value-related waveforms produced by storing in the memory the digitized sample values of the periodic profile such that cyclically, during each 60 electrical degree interval, profiles of the out-phased drive voltage waveforms include a first profile that is stable in a saturated region, a second profile exiting, at the beginning of the interval, a state of incipient saturation, and a third profile reaching, at the end of the interval, a state of incipient saturation, and the device passing between a sinusoidal drive mode and a distorted drive mode based upon the control factor.

16. The device of claim 15, wherein the peak value-related waveforms are one of sinusoidal waveforms with a maximum peak value and distorted waveforms of enhanced maximum peak value.

17. The device of claim 15, wherein the control factor is able range beyond a unit value corresponding to a maximum PWM dynamic to maintain a sinusoidal drive voltage on each winding of the motor, and producing, when increasing beyond the unit value, distorted square-waveforms of a peak value larger than that obtainable with sinusoidal waveforms.

18. The device of claim 17, wherein when the control factor increases beyond the unit value, the resulting drive voltages on each winding are symmetrically distorted in respect to a zero value.

19. The device of claim 15, wherein the out-phased drive voltage waveforms are applied at the windings so that at each instant of an electrical revolution, one of the output half-bridges is at one of a low and high saturation state, and the other two output half-bridges are switching.

20. The device of claim 19, wherein each output half-bridge is kept at the saturation state for 120 electrical degrees during an electrical revolution including being kept at low saturation state for 60 electrical degrees and at high saturation state for the other 60 electrical degrees, the low and high saturation states being separated by an interval of 120 electrical degrees during which the output half-bridge is driven.

\* \* \* \* \*

UNITED STATES PATENT AND TRADEMARK OFFICE
CERTIFICATE OF CORRECTION

PATENT NO. : 7,834,568 B2
APPLICATION NO. : 12/175626
DATED : November 16, 2010
INVENTOR(S) : Galbiati et al.

It is certified that error appears in the above-identified patent and that said Letters Patent is hereby corrected as shown below:

Column 4, Line 6     Delete: "neutral-point"
                     Insert: --neutral point--

Column 4, Line 32    Delete: "allow to"
                     Insert: --allow it to--

Column 6, Line 42    Delete: "able range"
                     Insert: --able to range--

Column 7, Line 29    Delete: "able range"
                     Insert: --able to range--

Signed and Sealed this
Fifth Day of July, 2011

David J. Kappos
*Director of the United States Patent and Trademark Office*